United States Patent [19]
Lack et al.

[11] Patent Number: 4,753,196
[45] Date of Patent: Jun. 28, 1988

[54] ANIMAL WATERING APPARATUS AND METHOD

[75] Inventors: Frank Lack; Francis R. Rustin, both of Springfield, Mo.

[73] Assignee: Agri Manufacturing Corp., Springfield, Mo.

[21] Appl. No.: 893,775

[22] Filed: Aug. 6, 1986

[51] Int. Cl.$^4$ ............................................. A01K 7/00
[52] U.S. Cl. ..................... 119/72; 119/72.5; 119/75; 248/58; 248/61; 248/68.1
[58] Field of Search ............... 119/72.5, 51.5, 72, 119/73, 74, 75, 81; 248/68.1, 61; 240/58, 89

[56] References Cited

U.S. PATENT DOCUMENTS

| | | | |
|---|---|---|---|
| 810,004 | 1/1906 | Tabler | 248/61 |
| 3,076,865 | 2/1963 | Volk et al. | 248/68.1 X |
| 3,664,305 | 5/1972 | Hart et al. | 119/72 |
| 3,724,425 | 4/1973 | Thompson | 119/72.5 X |
| 4,015,625 | 4/1977 | Alexander | 248/58 X |
| 4,267,800 | 5/1981 | Keller et al. | 119/72.5 |
| 4,341,182 | 7/1982 | Rustin et al. | 119/75 |
| 4,407,472 | 10/1983 | Beck | 248/58 X |

OTHER PUBLICATIONS

Erico Products Catalog, ©1973, p. 19, "Caddy ® Special Combination Connector".

Primary Examiner—David A. Scherbel
Assistant Examiner—Richard E. Chilcot, Jr.
Attorney, Agent, or Firm—Glaser, Griggs & Schwartz

[57] ABSTRACT

A water line, made up of joined sections of PVC pipe, may have any desired length. The pipe is suspended from drops at ten (10) foot intervals for example. The pipe is partially supported in plastic drop hangers having insulating and elastic properties. The drop hangers have an aperture at the upper end for connection to a drop, a laterally opening recess at the lower end to receive the pipe in snap-in relation, and a laterally opening recess intermediate its ends for receiving a metal conduit in snap-in relation. The metal conduit is formed as a continuous line and functions as a part of an electric circuit. Plastic support hangers have corresponding laterally opening recesses for the pipe and conduit. The support hangers are used as needed between the drop hangers to maintain the pipe in non-sagging relation relative to the conduit or to support a shocker wire. The pipe carries spaced animal operated drinker valves, which may be mounted in drinker cups. The conduit recesses of the hangers allow relative longitudinal movement of the conduit to accommodate different rates of thermal expansion of the conduit and pipe. A shocker wire is supported by the hangers above and parallel with the conduit form branches of an electrical circuit. Birds seeking to roost on the wire will complete the circuit to produce a gentle shock.

20 Claims, 5 Drawing Sheets

ANIMAL WATERING APPARATUS AND METHOD

BACKGROUND AND SUMMARY OF THE INVENTION

This invention relates to the suspension of laterally extending conduits or pipes for carrying water or other fluids from overhead supports, and more particularly to suspending watering apparatus for poultry or other animals, the apparatus being designed for fast on site installation with minimal need for installation tools.

A broad object of this invention is to provide a novel apparatus and method for suspension of a conduit line, including hangers to which the conduit is joined in snap-in relation.

An important object of this invention is to provide watering apparatus for suspension from overhead supports, including a water line of indefinite length having animal operated drinking valves mounted thereon in spaced intervals, and in which the components thereof are readily assembled for ease of installation at the use site such as a poultry house.

While the watering apparatus described is for use in providing water for poultry in poultry houses, it will be understood that apparatus according to the invention may be used for the watering of other animals.

Another object of this invention is to provide such apparatus wherein many of the components of the apparatus are readily snapped together for assembly without the use of tools.

A further object of this invention is to provide such apparatus including non-conductive hangers for the water pipe and associated components including an anti-roost shocker wire.

Still another object of this invention is to provide such apparatus which is readily assembled without the use of fasteners such as nuts and bolts.

A still further object of this invention is to provide such apparatus which enables broken pipe or other components to be replaced very easily.

Another object of this invention is to provide such apparatus including the use of metal conduit as a non-sag support for PVC water pipe, and which accommodates the differing thermal expansion of the PVC pipe and metal conduit.

A further object of this invention is to provide such apparatus which is designed for ease of fabrication and installation, and accordingly, to minimize fabrication and installation costs.

Still another object of this invention is to provide such apparatus which utilizes light weight flexible PVC pipe as the water pipe, and provides effective non-sagging support for that water pipe.

Another object of this invention is to provide such apparatus having a water line of any desired length for carrying the drinking valves.

A further object of this invention is to provide such apparatus which requires a minimum of attention and maintenance by the operators of the apparatus.

Another object of this invention is to provide a simplified method for fabricating and installing an animal watering system.

These objects are accomplished broadly in a conduit system for suspension from overhead supports which includes a plurality of sections of conduit connected together to form a continuous conduit line and a plurality of hangers for supporting that line. The hangers each have means at one end for connection to a support, and have a laterally opening recess at the other end configured to receive the conduit in snap-in relation.

These objects are also accomplished in animal watering apparatus for suspension from overhead supports which includes the following components: A water line consists of a length of pipe having a plurality of longitudinally spaced drinking valves mounted thereon to be operated by the animals. A plurality of elongated drop hangers, for suspension by respective drops, each have means for connection to a drop at one end and a laterally opening recess at its other end configured to receive and support the water pipe and snap-in relation. A length of metal conduit is generally co-extensive in length with the water pipe. The drop hangers each have a second laterally opening recess, intermediate its ends, spaced longitudinally from the pipe recess and configured to receive and support the metal conduit in snap-in relation. A plurality of elongated support hangers each have first and second longitudinally spaced, laterally opening recesses for receiving and supporting, respectively, the water pipe and the metal conduit in snap-in relation. The support hangers are disposed in longitudinally spaced relation along the water line between the drop hangers.

These objects are also accomplished broadly in a method for fabricating a conduit line for suspension from overhead supports which includes the following steps: conduit sections are joined together to form a continuous conduit line; the conduit line is supported by longitudinally spaced elongated hangers; means is formed at one end of each hanger for securing same to an overhead support; a laterally opening recess is formed at the other end of each hanger, configured to receive the conduit in snap-in relation; the conduit line is supported by the hangers.

These objects are also accomplished in a method for fabricating animal watering apparatus including the following steps; fabricating a length of metal conduit; supporting the metal conduit by means of longitudinally spaced elongated drop hangers, adapted for connection to respective suspension drops; forming, in each drop hanger, a first laterally opening recess configured to receive and support the conduit in snap-in relation; fabricating a length of water pipe generally co-extensive with the metal conduit; mounting a plurality of animal operating drinking valves in spaced relation along the water pipe; forming in each drop hanger a second laterally opening recess configured to receive and support the water pipe in snap-in relation; supporting the water pipe by means of the drop hangers; further supporting the water pipe relative to the metal conduit by means of elongated support hangers spaced longitudinally between the drop hangers; and forming in each support hanger first and second longitudinally spaced laterally opening recesses configured, respectively to receive and support the metal conduit and the water pipe in snap-in relation.

The novel features and the advantages of the invention, as well as additional objects thereof, will be understood more fully from the following description when read in connection with the accompanying drawings.

DESCRIPTION OF THE PREFERRED EMBODIMENTS EMBODIMENT OF FIGS. 1 THROUGH 11

FIGS. 1 through 11 of the drawing illustrate one form of a watering apparatus which includes a continuous linear water line made up of coupled sections of water pipe 11. The watering apparatus 10 is supported from overhead supports in a poultry house for example; the supports including drop cables 12, referred to hereafter as drops, which are a part of a winching system for supporting the apparatus at selected levels above the floor. The water line is preferably fabricated from sections of plastic pipe 11, such as ⅜ inch PVC pipe, for example. Pipe of this type will sag, particularly in view of the weight of the water contained therein; and it is necessary therefore that the apparatus include means for supporting the pipe 11 between the drops 12 in a manner that it will not sag and will remain parallel with the floor. One means for doing this is to use a more rigid linear component, supported in parallel relation with the pipe 11; and the preferred component according to this invention is a metal conduit 13, fabricated from galvanized steel for example, and of a type used as electrical conduit in electrical work. A preferred conduit size is ¾ inch conduit.

Figure 3:
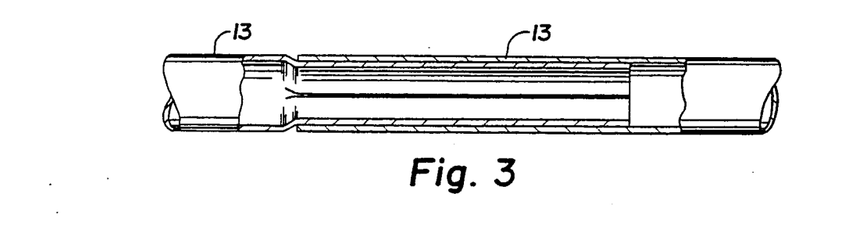
FIG. 3 is a detail view of illustrating the coupling of metal conduit sections.

The water line may be of any desired length, ranging from a relatively short length to the entire length of a large poultry house, for example; and the sections of PVC pipe are coupled together in the usual manner using conventional couplings 14, or the PVC pipe may have belled ends for coupling without the need for separate couplings. The metal conduit 13 consists of sections which are formed into a continuous line. Preferably one end of each conduit section 13 is crimped, as seen in FIG. 3 to be received in the adjoining section; and the crimped end if of substantial length such as four times the outer conduit diameter, to assure that the adjoining sections will not become easily uncoupled. The friction coupling of these conduit sections is sufficient for the intended purpose.

Figure 1:
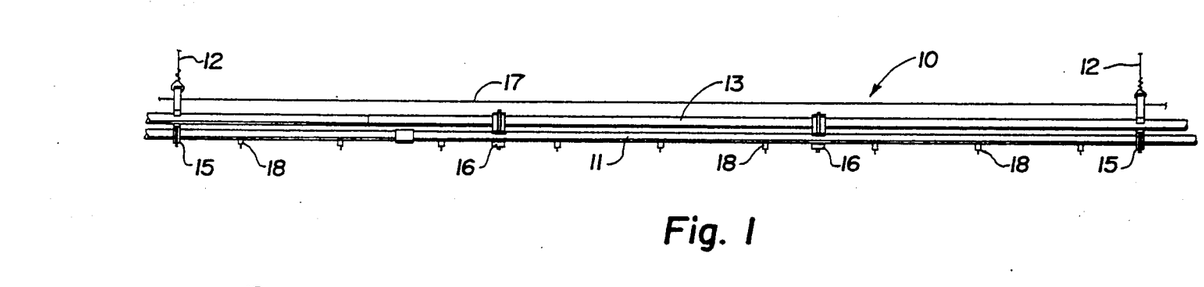
FIG. 1 is a view of a portion of one form of watering line according to the invention.
Figure 2:
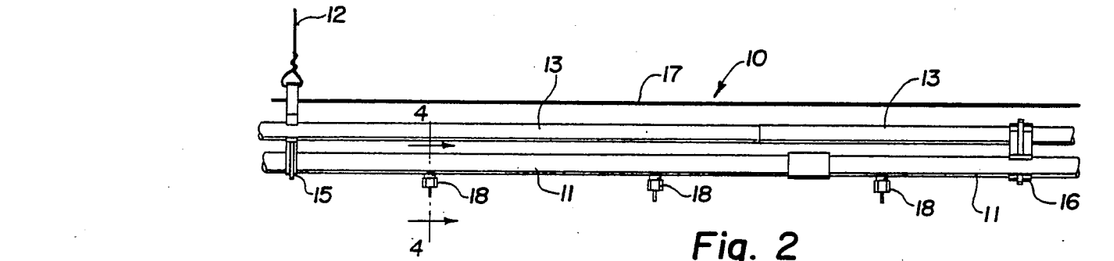
FIG. 2 is an enlarged view of a portion of the watering line illustrated in FIG. 1.

An important aspect of the present invention is the manner in which the above described water pipe 11 and metal conduit 13 are supported by the drops 12, and are supported relative to each other. The supporting components are different forms of hanger brackets which will be referred to as drop hangers 15 and support hangers 16. In the apparatus of FIG. 1, by way of example the drop hangers 15 may be spaced apart about 10 feet; and two support hangers 16 are located between the drop hangers; these support hangers being spaced about 40 inches from the drop hangers and from each other.

As will be described in greater detail subsequently, the drop hangers 15 support both the water pipe 11 and the metal conduit 13; and the support hangers 16 support the pipe 11 from the conduit 13. The drop hangers 15 also support a shocker wire 17, which is suspended under spring tension above and in parallel relation to the conduit 13. This shocker wire functions as an antiroost device; and is connected with the conduit 13 in a low voltage electric circuit. When a bird seeks to roost on the apparatus, its feet will make contact with both the shocker wire and the conduit completing the circuit to produce a light shock and dissuade the bird from continued roosting.

Figure 4:
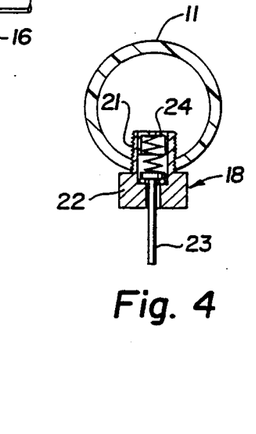
FIG. 4 is a cross-sectional view of the water pipe and a watering valve mounted thereon.
Figure 5:
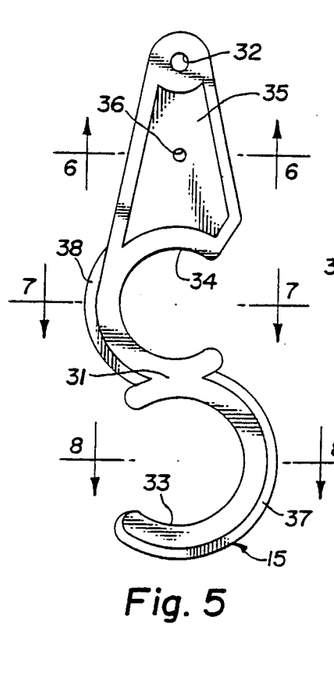
FIG. 5 is a detail side view of a drop hanger illustrated in FIG. 2.
Figure 6:
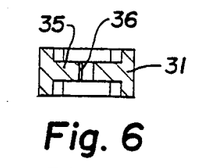
FIGS. 6, 7 and 8 are cross-sectional views of the drop hanger taken, respectively, along the lines 6—6, 7—7, and 8—8 of FIG. 5.
Figure 7:
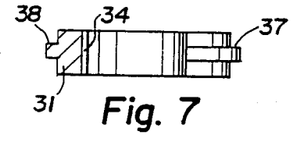
Figure 8:
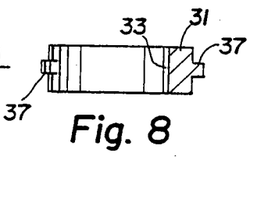

The birds obtain water from the pipe 11 through selfactuated valves 18 sometimes referred to as nibbler valves, one of which is illustrated in detail in FIG. 4. The pipe 11 is provided with threaded holes at longitudinally spaced intervals for receiving the threaded bodies of the valves 18. A desired form of that valve 18 has an elongated generally cylindrical body 21, externally threaded throughout a good portion of its length and having a hex head 22 at one end providing a transverse external shoulder for engaging the external surface of the pipe. Internally, the valve 18 has a stepped bore defining a valve seat shoulder; and a valve closure member 23 consists of a head engaging the valve seat in sealing relation, and a stem extending through and projecting beyond the hex head end of the body. An internal biasing spring 24 maintains the valve closure member in the closed position. The closure member is tiltable by the birds to allow water flow from the pipe 11 along the closure member stem and into the mouths of the birds.

The drop hangers 15 and the support hangers 16 are preferably fabricated from a plastic material which is electrically insulating; and the hangers illustrated in the drawings are molded parts. The drop hanger 15, illustrated in detail in FIGS. 5 through 8, consist of an elongated body 31 having a generally uniform thickness. The illustrated drop hanger, designed for supporting both pipe and conduit having outer diameters of about 1 inch, is about 4½ inches long and has a thickness of about ⅜ inch. A hole 32, about 3/16 inch diameter for example, is provided at the upper end of the body for connection to the suspending drop 12. A laterally opening recess 33 is provided adjacent to the lower end, the interior of the recess being partially cylindrical having an arc of about 265 degrees. The diameter of the recess 33 is substantially the same as the outer diameter of the pipe 11 so that the pipe is snugly retained within the recess. The mouth of the recess 33 then is smaller than the diameter of the pipe; and the drop hanger has a certain elasticity so that the mouth will open to receive the pipe in a snap-in relation. In this manner the drop hanger is readily assembled with the pipe merely by snapping the member over the pipe; and the pipe and hanger are then securely retained in the desired relationship. The body 31 includes an exterior strengthening rib 37 for the portion defining the recess 33.

A similar laterally opening recess 34 is provided intermediate the ends of the body 31 for receiving the conduit 13 in the same snap-in relationship. The recess 34 is configured similar to the recess 33; but the recess 34 is dimensioned slightly larger than the outer diameter of the conduit 13 to allow for relatively free sliding movement of the conduit relative to the drop hanger. This will allow for movement of the conduit relative to the supported pipe 11 to accommodate the greater expansion and contraction of the conduit relative to the pipe due to temperature changes, and eliminate the possibility of bowing of the apparatus due to the different expansion coefficients of the conduit and the pipe materials A strengthening rib 38 is provided for the body portion providing the recess 34. A reduced thickness web 35 is provided in the upper portion of the body at which is formed a hole 36 for supporting the shocker wire 17. The shocker wire then is normally supported in insulating relation to the conduit 13, since these components are both connected in the electric shocker circuit as mentioned above.

Figure 9:
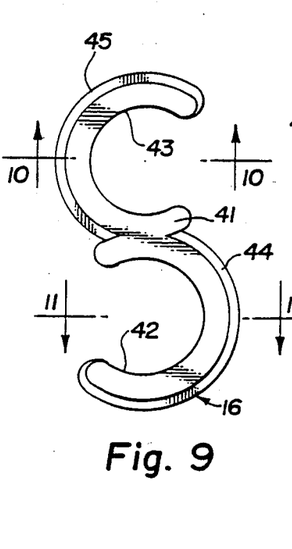
FIG. 9 is a detail side view of a support hanger illustrated in FIG. 2.
Figure 10:
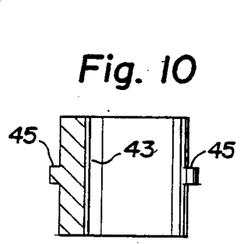
FIGS. 10 and 11 are cross-sectional views of the support hanger taken, respectively, along the lines 10—10 and 11—11 of FIG. 9.
Figure 11:
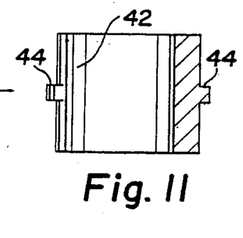

The support hanger 16, illustrated in detail in FIGS. 9 through 11, consists of an elongated, S-shaped body 41 providing a lower pipe recess 42 and an upper conduit recess 43. The body has a uniform thickness, about 1 inch for example, and is designed only to support the water pipe 11 from the metal conduit 13. The recesses 42 and 43 are configured identically to the recesses 33 and 34 of the drop hanger, both having cylindrical interiors having an arcuate extent of about 265 degrees and defining mouths smaller than the outer diameters of the respective pipe and conduit. The body includes a strengthening rib 44 for the pipe recess portion and a strengthening rib 45 for the conduit recess portion. Alternatively, the support hangers 16 may have the same configuration as the drop hangers 15, including a hole 36 for supporting the shocker wire between the drop hangers should that be necessary.

Referring again to the overall assembly of the apparatus 10, illustrated in FIG. 1, with the apparatus being suspended at 10 foot intervals by the drops 12, a metal conduit 13 is sufficiently rigid to maintain the pipe in parallel relation to the floor by means of the intermediate support hangers 16. The nibbler valves 18 are placed at desired intervals along the sections of pipe 11; and this assembly is preferably done at the fabrication plant wherein the nibbler valves are mounted at the desired locations on various sections of pipe 11, with these sections then being identified for assembly in proper order at the use site. For assembly at the site, the sections of pipe 11 with mounted valves are preferably joined together first, in the usual manner using a suitable cement, since the pipe sections must be assembled, of course, with the valves 18 oriented in one direction. The drop hangers 15 may then be connected to the drops 12 to establish the desired height relationship from the floor. The sections of metal conduit 13 may then be coupled together and connected to the drop hangers merely by snapping the conduit into the appropriate recesses. Following this the assembled water pipe may be assembled to the drop hangers again by snapping the pipe into the appropriate recesses; and the intervening support hangers may then be snapped into place onto the metal conduit and the water pipe. The entire assembly, then, is accomplished without the use of tools, except as may be necessary to connect the drop hangers to the drops 12.

EMBODIMENT OF FIGS. 12 THROUGH 18

FIGS. 12 through 18 of the drawing illustrate another form of watering apparatus 50 which includes a continuous linear water line made up of coupled sections of water pipe 51. The watering apparatus 50 is supported from overhead supports in a poultry house for example; the supports including drops 52 which are a part of the winching system. The water line is preferably fabricated from sections of plastic pipe 51, such as ¾ inch PVC pipe for example. Since pipe of this type will sag, as discussed above, the apparatus 50 includes means for supporting the pipe 51 between the drops 12 in the form of metal conduit 13, fabricated from galvanized steel for example, of the type used as electrical conduit in electrical work. A preferred conduit size is ¾ inch conduit. The water line may be of any desired length, ranging from a relatively short length to the entire length of a large poultry house for example; and the sections of PVC pipe are coupled together in the usual manner. Using conventional couplings 54, or the PVC pipe may have belled ends for coupling without the need for separate couplings. The metal conduit 53 consists of sections which are formed into a continuous line. Preferably one end of each conduit section 53 is crimped, as described above, to be received and frictionally coupled to the adjoining section.

An important aspect of the invention is the manner in which the above described water pipe 51 and metal conduit 53 are supported by the drops 52, and are supported relative to each other. The supporting components are identical hanger brackets which will be referred to as drop hangers 55 and support hangers 56 to identify different hanger functions.

Figure 12:
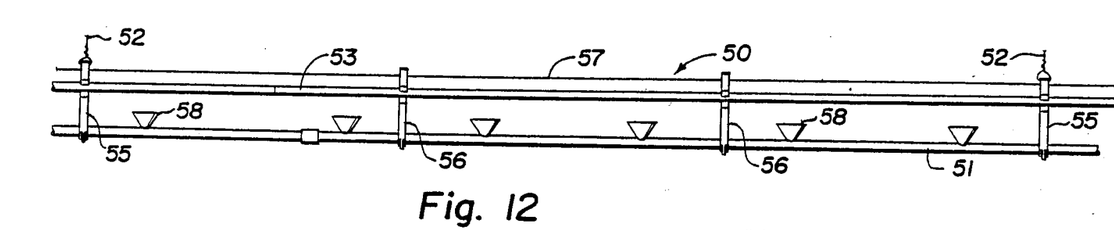
FIG. 12 is a view of a portion of another form of watering apparatus according to the invention.
Figure 13:
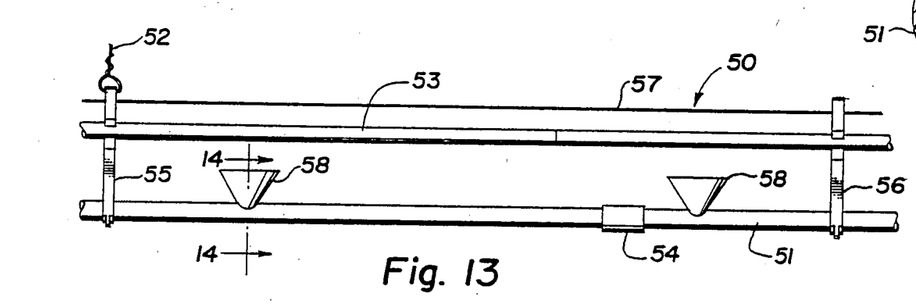
FIG. 13 is an enlarged view of a portion of the apparatus illustrated in FIG. 12.

In the apparatus of FIG. 12, by way of example the drop hangers 55 may be spaced apart about 10 feet; and two support hangers 56 are located between the drop hangers, these support hangers being spaced about 40 inches from the drop hangers and from each other.

As will be described in greater detail subsequently, the drop hangers 55 support both the water pipe 51 and the metal conduit 53; and the support hangers 56 support the pipe 51 from the conduit 53. The drop hangers 55 as well as the support hangers 56, support a shocker wire 57 which is suspended under spring tension above and in parallel relation to the conduit 53. This shocker wire functions as an anti-roost device, in the manner described with respect to the apparatus of FIG. 1.

Figure 14:
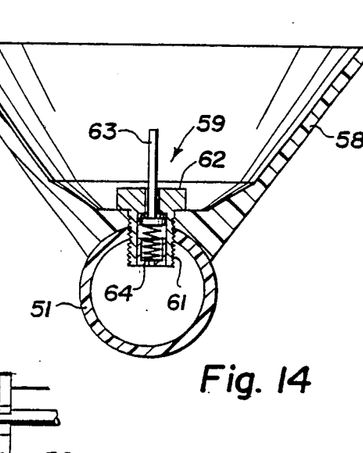
FIG. 14 is a cross-sectional view of a watering valve and associated cup mounted on the water pipe.

In this apparatus 50, the birds obtain water from the pipe 51 through a plurality drinker cups 58 which are mounted on the pipe at longitudinally spaced intervals. By way of example, the drinker cups 58 illustrated in FIG. 12 may be spaced at 20 inch intervals. The drinker cups 58 are preferably secured on the pipe 51 by associated drinker valves 59, sometimes referred to as nibbler valves; and these drinker cups and drinker valves may be of any suitable design. FIG. 14 of the drawing is a detailed cross-sectional view of a drinker cup 58 and valve 59. As seen in the drawing, the cup 58 has a generally conical shape with conical exterior and interior walls, and with a generally flat interior base wall for seating a portion of the drinker valve 59. The exterior of the cup base is provided with a transverse cylindrical surface having a diameter corresponding to the exterior diameter of the pipe 51 to provide for secure seating of the cup on the pipe.

The pipe is provided with threaded holes for receiving the threaded body of the valve 59. The drinker valve has an elongated generally cyclindrical body 61 externally threaded throughout a good portion of its length and having a hex head 62 at one end providing a transverse external shoulder for engaging and clamping the cup 58. Internally, the valve has a stepped bore defining a valve seat shoulder; and a valve closure member 63 consists of a head engaging the valve seat in sealing relation, and a stem extending through and projecting beyond the hex head end of the body. An internal biasing spring 64 maintains the valve closure member in the closed position. The closure member is tiltable by the birds to allow water to flow from the pipe 51 into the cup 58.

The hanger brackets 15 and 16 are preferably fabricated from a plastic material which is electrically insulating; and the drop hanger 65, illustrated in detail in FIGS. 15 through 18 is a molded part. This drop hanger consists of an elongated body having a generally uniform thickness, and including a laterally opening pipe recess 71 at its lower end, a laterally opening conduit recess 72 adjacent to its upper end, a central body portion 73 between the two recesses, and an upper body portion 74. In the apparatus 50, the water pipe 51 must be spaced from the metal conduit 53 a sufficient distance for the birds to have access to the cups 58. Those cups may have a height of about 1½ inches above the water pipe, for example; and the illustrated drop hanger is designed for supporting the pipe and conduit at about a 4¾ inch centerto-center distance. A hole 75, about 3/16 inch in diameter for example, is provided at the upper end of the upper body portion 74 for connection to the suspending drop 52. This upper body portion consists partially of a reduced thickness web; and a hole 76 is provided is provided in this web for supporting the shocker wire 67. The shocker wire then is normally supported in insulating relation to the conduit 53, since these components are both connected to the electric shocker circuit as mentioned above.

The interiors of the recesses 71 and 72 are partially cylindrical having an arc of about 265 degrees. The diameter of the recess 71 is substantially the same as the outer diameter of the pipe 51, so that the pipe is snugly retained within the recess. The mouth of the recess 71 then is smaller than the diameter of the pipe, and the drop hanger has a certain elasticity so that the mouth will open to receive the pipe in a snap-in relation. In this manner the drop hanger is readily assembled with the pipe merely by snapping the member over the pipe; and the pipe and hanger are then securely retained in the desired relationship.

Figure 15:
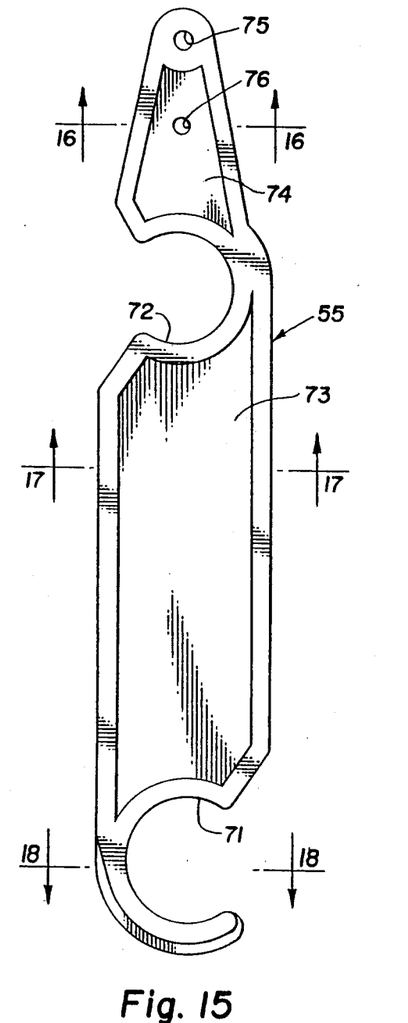
FIG. 15 is a detail side view of a drop hanger and support hanger illustrated in FIG. 13.
Figure 16:
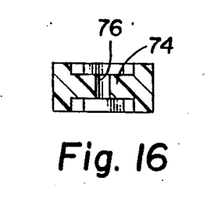
FIGS. 16, 17 and 18 are cross-sectional views of the drop hanger taken, respectively, along the lines 16—16, 17—17, and 18—18, of FIG. 15.
Figure 17:
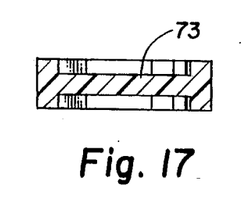
Figure 18:
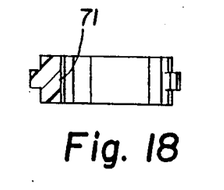

The recess 72 is configured to receive the conduit 53 in the same snap-in relationship. The recess 72 is configured similar to the recess 71; but the recess 72 is dimensioned slightly larger than the outer diameter of the conduit 53 to allow for relatively free sliding movement of the conduit relative to the drop hanger. This will allow for movement of the conduit relative to the supported pipe 51 to accommodate the greater expansion and contraction of the conduit relative to the pipe due to temperature changes, and eliminate the possibility of bowing of the apparatus due to the different expansion coefficients of the conduit and pipe materials.

As mentioned above, the support hangers 56 are identical in design and size to eliminate the necessity of fabricating two separate parts. The support hangers could be modified to eliminate the upper body portions 74, since the hole 75 is not utilized, and since the additional support hole 74 for the shocker wire 57 would not be necessary. In the illustrated embodiment, the shocker wire 57 is supported by the support hanger 56, since that component is identical to the drop hanger 55.

Referring again to the overall assembly of the apparatus 50, illustrated to FIG. 12, with the apparatus being suspended at 10 foot intervals by the drops 52, the metal conduit 53 is sufficiently rigid to maintain the pipe in parallel relation to the floor by means of the intermediate support hangers 56. The cups 58 and associated valves are placed at desired intervals along the sections of pipe 51; and this assembly is preferably done at the fabrication plant where the cups and valves are mounted at the desired locations at various sections of pipe 51, with these sections being identified for assembly in proper order at the use site. For assembly at the site, the sections of pipe 11 with mounted cups and valves are preferably joined together first, in the usual manner using a suitable cement, since the pipe sections must be assembled with the cups 58 oriented in one direction. The drop hangers 55 may then be connected to the drops 12 to establish the desired height relationship from the floor. The sections of metal conduit 53 may then be coupled together and connected to the drop hangers merely by snapping the conduit into the appropriate recesses. Following this the assembled water pipe may be connected to the drop hangers again by snapping the pipe into the appropriate recesses; and the intervening support hangers may then be snapped into place onto the metal conduit and water pipe. The entire assembly, then, is accomplished without the use of tools, except as may be necessary to connect the drop hangers to the drops 52.

Figure 19:
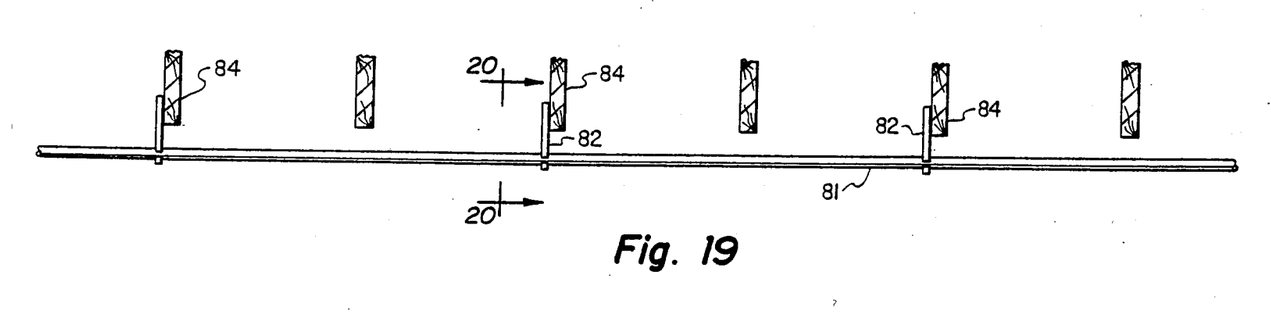
FIG. 19 is a diagrammatic view illustrating the suspension of a conduit line from rafters or joists of a structure.
Figure 20:
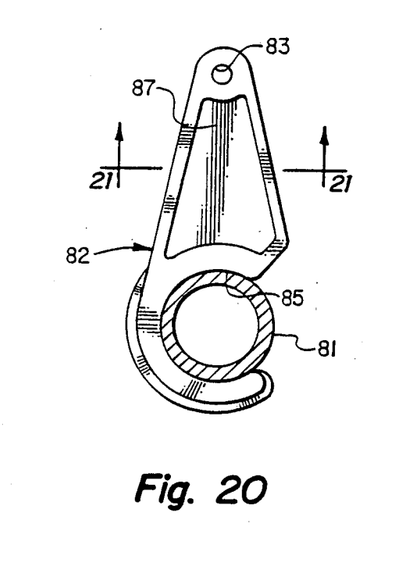
FIG. 20 is a view taken along the line 20—20 of FIG. 19 illustrating a conduit hanger.
Figure 21:
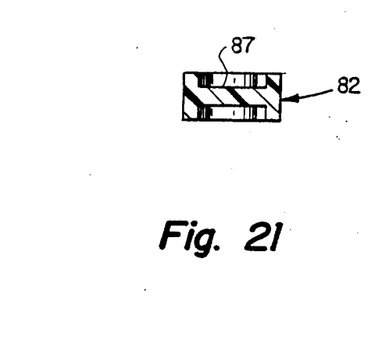
FIG. 21 is a view taken along the line 21—21 of FIG. 20.

EMBODIMENT OF FIGS. 19 THROUGH 21

FIGS. 19 through 21 of the drawing illustrate a broader form of conduit system for the conveying of water or other fluids. This system consists of the conduit line 81 supported at suitably spaced intervals by hangers 82. The conduit line 81 may be fabricated from sections of PVC or galvanized iron pipe for example, coupled together in a conventional manner, and may have bends or curves as well as straight line sections.

The hangers 82 may be simplified forms of the hangers above described; and FIG. 20 of the drawing illustrates in some detail an elongated hanger 82 somewhat similar to the hangers described previously and which may be fabricated from a plastic material by molding for example. As seen in the drawing, this hanger 82 has a transverse hole 83 at its upper end by means of which the hanger may be secured as by nailing to a structural member. FIG. 1 of the drawing illustrates structural members 84 such as floor joists or ceiling rafters to which the hangers may be secured by driving suitable nails through the apertures 83. A laterally opening recess 85, at the lower end of the hanger 82 is configured to receive the conduit 86 in snap-in relation. In order to conserve plastic material in the fabrication of the hangers 82, a portion of the hanger may be fabricated to have a reduced thickness web 87, as best seen in FIG. 21.

METHOD

A method for fabricating watering apparatus according to the invention may include the following steps:

A continuous water line is fabricated by joining sections of PVC plastic pipe 11 or 51, for example. The pipe sections may be joined together by means of conventional pipe couplings using suitable PVC cement. Alternatively, the pipe sections may be formed with belled ends, so that the sections may be cemented together without couplings. Preferably, the animal-operated valves have threaded bodies; and the valves are assembled to the pipe by forming threaded apertures in the pipe to receive the valve bodies. In the FIG. 12 configuration, the drinker cups 58 are secured to the pipe by means of the valves 59.

The metal conduit also consists of a plurality of joined sections. The conduit sections are joined together in a manner to maintain the linearity of the conduit line; and for this purpose, the conduit sections may be joined by crimping one end to be received within the adjoining section, with the crimped end having a substantial length such as about four times the outer diameter of the conduit. The crimped end is configured to provide for frictional coupling of the conduit sections to assure the integrity of the continuous conduit line, and also to provide for electrical connection between adjacent sections, since the conduit will serve as a part of an electric circuit.

The drop hangers and the support hangers are fabricated from a suitable plastic material such as polyvinylchloride (PVC) for example. Preferably, the hangers will be molded as by injection molding. The plastic materials should have elastic properties, since recesses are formed in the hangers to receive in snap-in relation the conduit and the pipe. The pipe receiving recesses are partially cylinder configuration and are formed with arcs of about 165° to provide a mouth significantly smaller than the maximum diameter of the recess. Since the diameters of the conduit and pipe are approximately the same as the diameters of the respective recesses, the recess mouth must spread to accommodate the snap-in assembly.

The drop hangers are formed as elongated members having a laterally opening pipe recess at one end, an aperture at the other end for connecting the hanger to a supporting drop, and a laterally opening recess intermediate the ends for the metal conduit, the conduit recess being spaced as desired from the pipe recess. In the FIG. 1 configuration, the animal-operated valves extend downward and away from the conduit; therefore the conduit and pipe recesses are close together, and the support hangers may be compact "S" shaped members as illustrated in FIGS. 9 through 11.

For the aparatus of FIG. 12, where the drinker cups are mounted on the top side of the pipe, the spacing between the pipe and the conduit must be much greater; and the respective recesses are accordingly so spaced in the drop hangers as illustrated in FIG. 15.

Aperatures are provided in the drop hangers, above the conduit recesses, for supporting a shocker wire functioning as an anti-roost wire. The shocker wire is supported in tension and in parallel relation above the conduit, being tensioned by a spring such that the weight of the birds intending to roost on the wire will move the wire toward the conduit. The shocker wire and conduit are connected as parallel branches of an electric circuit; and as the shocker wire is moved toward the conduit, the feet of the birds will complete the circuit, thereby providing a light shock to the birds to inhibit the roosting.

The valves or valve-cup assemblies are preferably mounted on the several pipe sections at a fabrication plant for delivery to the use site. At the use site, the pipe sections are first assembled together to orient the valves in the same radial plane. The hanger brackets may then be connected to the drops to fix the desired height of the apparatus from the floor of the poultry house or other building. The assembled pipe may then be snapped into the drop hangers to fix the desired orientation of the valves, either down or up, relative to the drop hangers. The conduit sections may then be assembled and then snapped into the respective conduit recesses. Following that the support hangers may be snapped onto the conduit and pipe at desired spacing between the drop hangers. Then the shocker wire may be assembled to the support hangers and the shocker wire and conduit connected into the electric circuit. The assembly is completed by connecting the pipe to the water supply in association with necessary fittings such as shut-off valve pressure-control valve, and drainage valve.

What has been described is a novel and unique conduit system, particularly in the form of animal watering apparatus, adapted for suspension from overhead supports, and a novel and unique method for fabricating such apparatus. The animal watering apparatus features spaced drinking valves which are operated by the animals themselves enabling them to take drinking water as desired.

A principal feature and an advantage of the invention is the economic aspect, including (1) that the components o f the system are designed to be fabricated at reasonable cost; (2) that the components of the system are designed for ease of assembly at the use site whereby the installation costs are minimized.

A related feature and advantage of the invention is that the drop hangers and support hangers are fabricated from a plastic material having elastic properties, formed with laterally opening recesses into which the conduit and pipe are snapped, thereby providing good support for the pipe and conduit and also enabling convenient on-site assembly of the hangers, pipe and conduit without the use of tools.

Another related feature and advantage of the invention is that the drop hangers and support hangers are fabricated from a plastic material which has electrically insulating properties. This enables the support of the metal conduit and the shocker wire, both of which form part of an electric circuit, without the necessity of special provisions to insulate the wire and conduit from the hangers.

An important feature and advantage of the invention is that it enables the use plastic pipe, such as PVC pipe, for the water line, and enables the support of that pipe in a non-sagging relation to maintain the selected space relationship of the pipe from the floor of the poultry house or other building.

While the preferred embodiments of the invention have been illustrated and described, it will be understood by those skilled in the art that changes and modifications may be resorted to without departing from the spirit and scope of the invention.

What is claimed is:

1. In animal watering apparatus for suspension from overhead supports, the improvement comprising a water line consisting of a length of pipe having a plurality of longitudinally spaced drinking valves mounted thereon to be operated by animals;

a plurality of elongated drop hangers, for suspension by respective drops, each having means for connection to a drop adjacent to one end and a first laterally opening recess at its other end configured to receive said water pipe in snap-in relation;

a length of metal conduit generally co-extensive in length with said water pipe;

said drop hangers each having a second laterally opening recess, intermediate its ends, spaced longitudinally from said pipe recess and configured to receive said metal conduit in snap-in relation;

a plurality of elongated support hangers, each having first and second longitudinally spaced, laterally opening recesses for receiving, respectively, said water pipe and said metal conduit in snap-in relation; said support hangers being disposed in longitudinally spaced relation along said water line between said drop hangers;

and said drop hangers and said support hangers maintaining said water pipe in generally parallel relation to said metal conduit.

2. Apparatus as set forth in claim 1 including
said drop hanger being fabricated from insulating material;
an electric current-carrying shocker wire supported by said drop hangers above said conduit in relatively close parallel relation thereto.

3. Apparatus as set forth in claim 2 including
said conduit and said shocker wire being connected as parallel branches of an electric circuit.

4. Apparatus as set forth in claim 1 including
said drop hangers and said support hangers being fabricated from insulating materials;
an electric current-carrying shocker wire supported by said drop hangers and said support hangers above said conduit in relatively close parallel relation thereto.

5. Apparatus as set forth in claim 1 including
said drop hangers and said support hangers being fabricated from a plastic material having the elastic properties.

6. Apparatus as set forth in claim 1 including
said water pipe being fabricated from a plastic material; said first recesses being partially cylindrical and having a diameter substantially the same as that of said pipe, whereby said pipe is frictionally held within said recesses.

7. Apparatus as set forth in claim 6 including
said conduit being fabricated from metal;
said second recesses being partially cylindrical having a diameter slightly larger than that of said conduit, thereby providing relatively free movement of said conduit relative to said drop hangers and said support hangers.

8. Apparatus as set forth in claim 1 including
said metal conduit comprising sections to be joined together, each section having one crimped end configured to be frictionally received within the end of an adjoining section; said crimped end having a length of about four times the maximum transverse dimension of said conduit.

9. Apparatus as set forth in claim 1 including
said drinking valves extending downward from the underside of said pipe; said pipe being supported below said conduit in close relation thereto.

10. Apparatus as set forth in claim 1 including
said animal operated valves being enclosed in drinker cups mounted on the upper side of said pipe; and said pipe being supported below said conduit in sufficiently spaced relation to allow animal access to said drinker cups.

11. A method for fabricating animal watering apparatus for suspension from overhead supports, including the steps:
fabricating a length of metal conduit; supporting said metal conduit by means of longitudinally spaced, elongated drop hangers adapted for connection to respective suspension drops;
forming in each of said drop hangers a first laterally opening recess configured to receive said metal conduit in snap-in relation;
fabricating a length of water pipe generally co-extensive with said metal conduit;
mounting a plurality of animal operated drinking valves in spaced relation along said water pipe;
forming in each of said drop hangers a second laterally opening recess configured to receive said water pipe in snap-in relation;
supporting said water pipe by means of said drop hangers;
further supporting said water pipe relative to said metal conduit by means of elongated support hangers spaced longitudinally between said drop hangers;
forming in each of each support hangers first and second longitudinally spaced laterally opening recesses configured, respectively, to receive said metal conduit and said water pipe in snap-in relation.

12. A method as set forth in claim 11 including the steps
snapping said drop hangers and said support hangers together with said metal conduit and said water pipe, to effect the on-site assembly of said poultry watering apparatus.

13. A method as set forth in claim 11 including the steps
fabricating said drop hangers and said support hangers from a plastic material having elastic properties.

14. A method as set forth in claim 11 including the steps
fabricating said pipe from a plastic material to have a uniform circular cross section;
forming said second recesses of said hangers as partially cylindrical recesses having a diameter corresponding to the outer diameter of said pipe, whereby said pipe is frictionally held within said recesses;
fabricating said metal conduit to have a generally uniform circular cross section; forming said first recesses as partially cylindrical recesses having a diameter slightly larger than the maximum outer diameter of said conduit, whereby said conduit may move longitudinally relative to said hangers.

15. A method as set forth in claim 11 including the steps
forming said second recesses of said drop hangers intermediate the ends thereof and adjacent to said second recesses;
and assembling said conduit and said pipe with said drop hangers, with said animal operated drinking valves extending downward and away from said conduit.

16. A method as set forth in claim 11 including the steps
    forming said second recesses of said drop hangers adjacent to one end thereof;
    forming said first recesses of said drop hangers intermediate the ends thereof, and spaced a substantial distance from said second recesses;
    assembling said conduit and said pipe with said drop hangers, with said animal operated drinking valves extending upward and toward said conduit;
    and mounting said drinking valves on said pipe within enclosed drinker cups; said pipe and conduit being spaced sufficiently to allow animal access to said drinker cups.

17. A method as set forth in claim 11 including the steps
    forming said drop hangers from an electrically insulated material;
    forming apertures in said drop hangers to support a shocker wire of an electric circuit above said conduit recesses;
    connecting said conduit and said shocker wire as parallel branches of an electric circuit.

18. A method as set forth in claim 11 including the steps
    forming said drop hangers and said support hangers from an electrically insulating material;
    forming apertures in said drop hangers and said support hangers to support a shocker wire of an electric circuit above said conduit recesses;
    connecting said conduit and said shocker wire as parallel branches of an electric circuit.

19. A method as set forth in claim 11 including the steps
    fabricating said length of water pipe as coupled sections of plastic pipe.

20. A method as set forth in claim 11 including the steps
    fabricating said metal conduit as coupled sections of conduit;
    crimping one end of each conduit section to form a reduced diameter end dimensioned to be frictionally received within the end of an adjoining section;
    forming said crimped end to have a length about four times the diameter of said conduit section.

* * * * *